(12) United States Patent
Kondo et al.

(10) Patent No.: US 7,884,883 B2
(45) Date of Patent: Feb. 8, 2011

(54) RECEIVING DEVICE, CONTROL METHOD FOR THE DEVICE, PROGRAM, AND SEMICONDUCTOR DEVICE

(75) Inventors: Satoshi Kondo, Kyoto (JP); Takahiro Nishi, Nara (JP); Hisao Sasai, Osaka (JP); Toshiyasu Sugio, Osaka (JP); Tadamasa Toma, Osaka (JP)

(73) Assignee: Panasonic Corporation, Osaka (JP)

( * ) Notice: Subject to any disclaimer, the term of this patent is extended or adjusted under 35 U.S.C. 154(b) by 1106 days.

(21) Appl. No.: 11/597,952

(22) PCT Filed: May 27, 2005

(86) PCT No.: PCT/JP2005/009791

§ 371 (c)(1),
(2), (4) Date: Nov. 29, 2006

(87) PCT Pub. No.: WO2006/003763

PCT Pub. Date: Jan. 12, 2006

(65) Prior Publication Data

US 2007/0211172 A1    Sep. 13, 2007

(30) Foreign Application Priority Data

Jul. 6, 2004    (JP) .............................. 2004-199800

(51) Int. Cl.
*H04N 5/445* (2011.01)

(52) U.S. Cl. ...................... 348/563; 348/473; 348/569; 348/731

(58) Field of Classification Search ......... 348/563–570, 348/554–555, 725, 731, 734, 461, 465, 468, 348/473, 474, 476–478; 725/32, 34–35, 725/38, 40, 50, 58, 131, 134, 139, 151–152; *H04N 5/445*
See application file for complete search history.

(56) References Cited

U.S. PATENT DOCUMENTS

| 5,311,317 A | * | 5/1994 | Ogura et al. ................. 348/725 |
| 5,452,023 A | * | 9/1995 | Kim ............................ 348/731 |

(Continued)

FOREIGN PATENT DOCUMENTS

EP    0 955 771    11/1999

(Continued)

OTHER PUBLICATIONS

English translation of paragraphs [0017]-[0027] and Fig. 4 of JP 2002-142167, cited in International Search Report, publication date of cited document: May 2002.

(Continued)

*Primary Examiner*—Trang U Tran
(74) *Attorney, Agent, or Firm*—Wenderoth, Lind & Ponack, L.L.P.

(57) ABSTRACT

A portable terminal device comprises a TV receiving unit and a TV processing unit for receiving a television broadcast, and a control unit for detecting the start and finish of channel changing, and notifying the user of a message that the channels are being changed for the time period from the start to finish of the changing. Further, the control unit displays information related to channels and information that indicates the progress of the channel changing in a display screen.

10 Claims, 7 Drawing Sheets

U.S. PATENT DOCUMENTS

| | | | |
|---|---|---|---|
| 5,786,845 A * | 7/1998 | Tsuria | 725/32 |
| 6,593,973 B1 | 7/2003 | Sullivan et al. | |
| 6,710,816 B1 * | 3/2004 | Minami | 348/554 |
| 7,227,583 B2 * | 6/2007 | Sin | 348/570 |
| 7,237,251 B1 * | 6/2007 | Oz et al. | 725/40 |
| 2002/0040481 A1 | 4/2002 | Okada et al. | |
| 2005/0076391 A1 | 4/2005 | Sugiyama et al. | |

FOREIGN PATENT DOCUMENTS

| | | |
|---|---|---|
| JP | 7-322241 | 12/1995 |
| JP | 9-135394 | 5/1997 |
| JP | 2001-157131 | 6/2001 |
| JP | 2001-339663 | 12/2001 |
| JP | 2002-142167 | 5/2002 |
| JP | 2005-080102 | 3/2005 |

OTHER PUBLICATIONS

English translation of paragraphs [0030]-[0037] of JP 2001-339663, cited in International Search Report, publication date of cited document: Dec. 2001.

English translation of paragraphs [0031], [0032], [0041] and [0042] of JP 7-322241, cited in International Search Report, publication date of cited document: Dec. 1995.

English translation of paragraphs [0018]-[0025] and Fig. 1 of JP 9-135394, cited in International Search Report, publication date of cited document: May 1997.

Supplementary European Search Report issued Aug. 29, 2008 in connection with European patent application No. 05743652.9 corresponding to the present U.S. application.

* cited by examiner

RECEIVING DEVICE, CONTROL METHOD FOR THE DEVICE, PROGRAM, AND SEMICONDUCTOR DEVICE

BACKGROUND OF THE INVENTION

1. Technical Field

The present invention relates to a receiving device that reproduces a digital broadcast, and particularly to a receiving device that reproduces a television broadcast program, a control method, a program and an integrated circuit for such a device.

2. Background Art

In recent years, the miniaturization and multi-functionalization of mobile terminal devices (for example cellular telephones and personal digital assistants) has progressed and models that can receive and display a television broadcast have been arriving on the market. For example, in Patent Document 1, an AV system for digital television broadcast reception is disclosed which displays the present time, the starting time and the ending time of a television broadcast program superimposed on a television broadcast display, immediately after changing channels. With this super-imposed display, it is possible for the user to easily ascertain the progress a television broadcast program is making.

Patent Document 1: Japanese Patent Laid-Open No. 2001-157131 Publication

However, for conventional mobile terminal devices that receive digital television broadcasts, it may take up to five seconds after the user changes channels until the television broadcast program on the chosen channel is actually displayed; in this interval, there is a possibility that the user may misperceive the device to be malfunctioning.

The problem is presented using FIG. 7. FIG. 7 is a schematic diagram that shows the picture types included in a digital broadcast according to MPEG-4 AVC standards. In the figure, it is shown that CHA is the original channel and CHB is the destination channel. "I" indicates an I picture which is intra-picture prediction-coded (intra predictive picture). "P" indicates a P picture (inter-predictive picture) which is inter-picture prediction-coded, using one reference picture. "B" indicates a B picture (inter bi-predictive picture) which is inter-picture prediction-coded, using two reference pictures. "IDR" indicates an IDR picture (instantaneous decoding refresh picture), a type of I picture, which indicates that all of the reference pictures stored in the reference picture memory in the decoder, may be invalidated. This IDR picture is a picture that can be decoded on its own without any reference pictures.

In the figure, time to is the time at which the user has changed channels from CHA to CHB. Time to is a time at which the first IDR picture included in CHB's digital television broadcast appears after the time t0. The mobile terminal device initiates decoding from the IDR picture of the time to. The interval between IDR pictures in a digital television broadcast is five seconds at most. Because of this, there may be cases where after the user changes the channel from CHA to CHB, it takes up to five seconds at most until CHB's television broadcast program is actually displayed. In contrast, for analog television broadcasting, from the user's point of view, the channels can be changed instantaneously. For users familiar with analog television broadcasting, there is a possibility that they may misperceive that the device is malfunctioning, since they cannot predict a digital television broadcast's waiting time.

SUMMARY OF THE INVENTION

The present invention has as an object to provide a receiving device that receives digital television broadcasts, and prevents the misperception of a malfunction while changing channels so as to give the user a sense of satisfaction.

The receiving device in the present invention includes a receiving unit which receives a television broadcast, a detection unit which detects an undetermined period until an output of the receiving unit is determined, and a notification unit which notifies a user of the undetermined period, during the undetermined period.

Here, the detection unit may be set to detect, as the undetermined period, at least one of: a changing period, from when a change of a receiving channel is initiated until an output of the receiving unit is determined; and a start-up period from when the receiving unit is started up until the output of the receiving unit is determined.

With this structure, it is possible to prevent a user's misperception that a malfunction occurs in the device.

Here, the notification unit may be set to notify the user of the changing period or the start-up period by at least one of audio output, light emission, vibration and display in a display screen.

Here, the notification unit may be set to display information related to a channel in the display screen. The information related to a channel may include at least one of the following: a number of an original channel; a number of a destination channel; a name of the original channel; a name of the destination channel; a number of the channel starting-up; and a name of the channel starting-up.

According to this structure, the user can be given a sense of satisfaction by displaying the number or name of the original and destination channels during the channel changing period, or by displaying the number or name of the channel starting-up.

Here, the notification unit may be set to display an image received before the channel is changed as a still image in a display screen. Or the notification unit may be set to display a specific image in a display screen.

Here, the notification unit may be set to display, in a display screen, information that indicates a progress state of the changing period or the start-up period. The information that indicates a progress state may be one of: a graphical bar that changes according to the progress state; a mark that changes according to the progress state; and a numeral that is counted down according to the progress state.

According to this structure, the user can be given a sense of satisfaction by making it possible to measure the amount of channel changing time and start-up time remaining.

Likewise, the reception method, program and semiconductor device of the present invention include the same units as above.

According to the receiving device in the present invention, it is possible to prevent a user's misperception that the device is malfunctioning during the channel changing period and the start-up period for television reception initialization. Further, a user can be given a sense of satisfaction by making it possible to measure the amount of channel changing time and start-up time remaining. Likewise, the user can be given a feeling of satisfaction by displaying the channel number or

NUMERICAL REFERENCES

Figure 1:
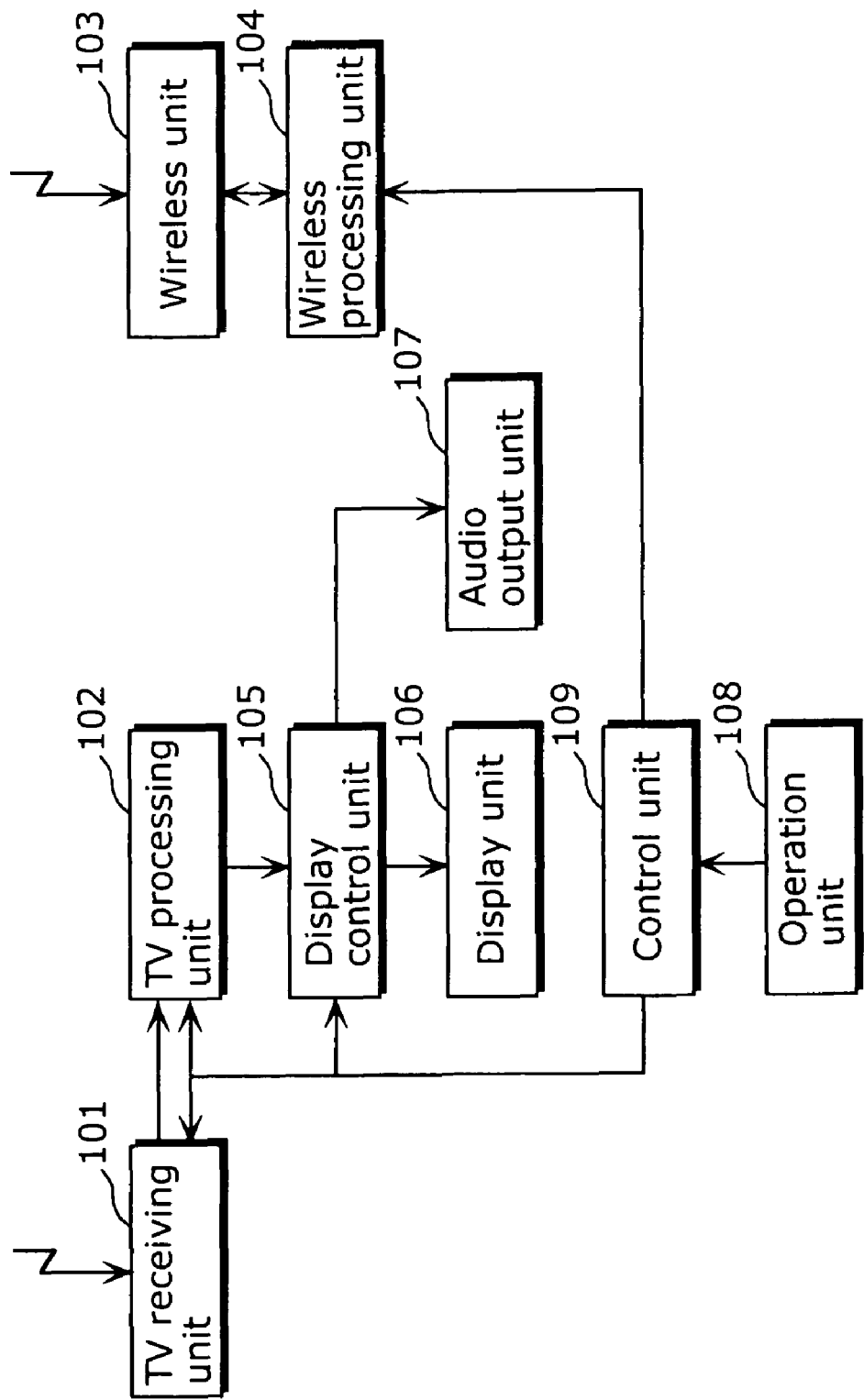
FIG. 1 is a block diagram that shows the structure of a mobile terminal device in an embodiment of the present invention.

101 TV receiving unit 101
102 TV processing unit 102
103 Wireless unit 103
104 Wireless processing unit 104
105 Display control unit 105
106 Display unit 106
107 Audio output unit 107
108 Operation unit 108
109 Control unit 109
201 System decoder 201
202 Stream buffer 202
203 Stream buffer 203
204 Video buffer 204
205 Audio decoder 205
206 Video buffer 206
207 Audio buffer 207

DETAILED DESCRIPTION OF THE INVENTION

FIG. 1 is a block diagram that shows the structure of a receiving device in the present embodiment. In the present embodiment, the case presented is one in which the receiving device is a mobile terminal device. In the figure, the mobile terminal device includes a TV receiving unit 101, a TV processing unit 102, a wireless unit 103, a wireless processing unit 104, a display control unit 105, a display unit 106, an audio output unit 107, an operation unit 108 and a control unit 109, and is configured so as to notify a user that the reception channel of the digital television broadcast is being changed during the changing period.

The TV receiving unit 101 is a television tuner compatible with one-segment service for digital terrestrial television broadcasting and receives a transport stream (called TS hereafter) of the one-segment. The one-channel bandwidth of a terrestrial digital television broadcast is split into 13 segments, and among those segments, 12 segments are allocated to services for home television receivers and one segment is allocated to services for mobile terminal devices. One-segment service is a service that broadcasts the contents of the other 12 segments in one segment.

Figure 2:
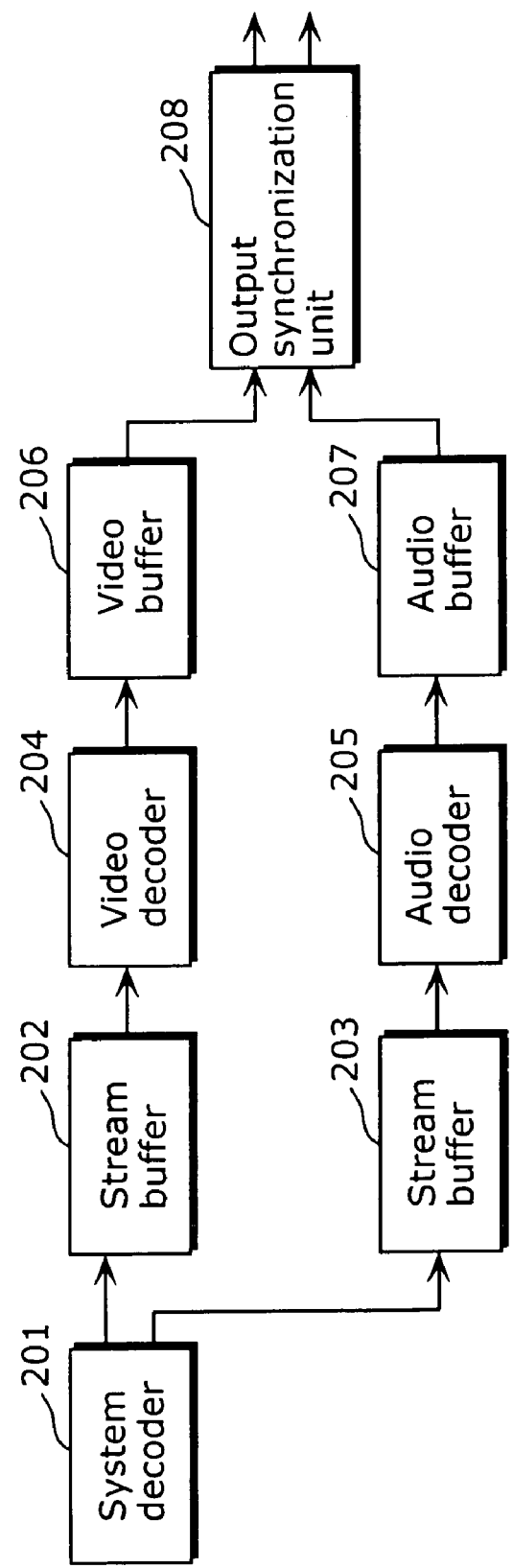
FIG. 2 is a block diagram that shows the structure of a television processing unit.
Figure 7:
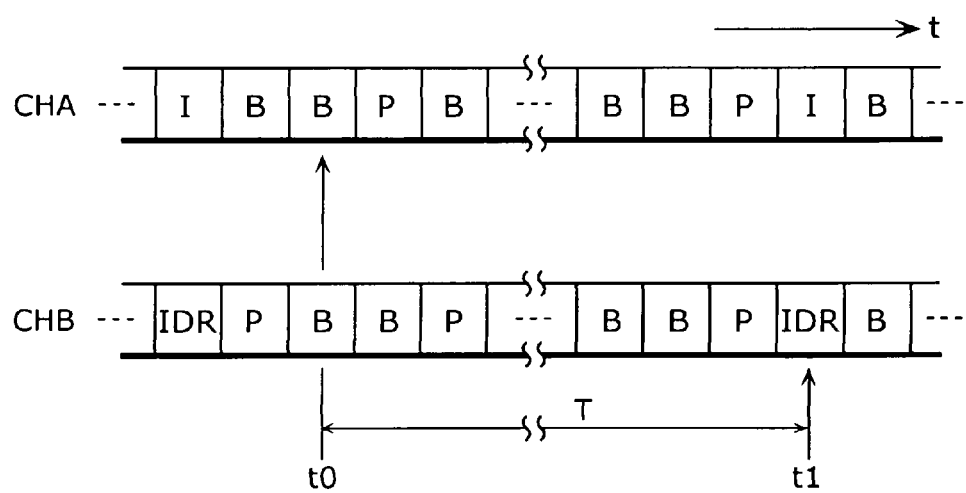
FIG. 7 is a diagram that shows the relationship between channel changing and an IDR picture.

The TV processing unit 102 is a TS decoder and an MPEG decoder, and decodes the one-segment TS received by the TV receiving unit 101. In FIG. 2, blocks are shown that illustrate the structure of the TV processing unit 102. The TV processing unit 102 comprises a system decoder 201, a stream buffer 202, a stream buffer 203, a video decoder 204, an audio decoder 205, a video buffer 206, an audio buffer 207 and an output synchronization unit 208. The TS (one-segment) outputted from the TV receiving unit 101 is separated into a video stream and an audio stream by the system decoder 201. The video stream is stored temporarily by the stream buffer 202 and decoded by the video decoder 204. As shown in FIG. 7, after the TV receiving unit 101 changes the reception channel from channel A to channel B, it takes five seconds at most to receive an IDR picture. The video decoder 204 extracts the initial IDR picture that appears from the video stream stored in the stream buffer 202, starts decoding of the picture and stores the decoded picture in the video buffer 206. On the other hand, after being stored temporarily in the stream buffer 203, the audio stream separated by the system decoder 201 is decoded by the audio decoder 205 and the audio data after decoding is stored in the audio buffer 207. The output synchronization unit 208 synchronizes video data (picture) in the video buffer 206 (picture), and audio data in the audio buffer 207 and outputs both data to the display control unit 105.

The wireless unit 103 performs a high-frequency modulation and demodulation for audio communication and data communication.

The wireless processing unit 104 performs a baseband signal modulation and demodulation for the wireless unit 103.

The display control unit 105 controls the video data and the audio data outputted by the TV processing unit 102 to display unit 106 and audio output unit 107. Also, the display control unit 105 controls a display, an audio output, a light emission and a vibration for notifying the user during the changing period in which the channel is being changed, according to the instruction from the control unit 122.

The display unit 106 is a display screen such as a liquid crystal display panel, and the like.

The audio output unit 107 reproduces an audio signal to a speaker, an earphone, headphones and so on.

The operation unit 108 has operation buttons such as tenkey, cross key and so on; and accepts a user operation.

The control unit 109 controls the whole mobile terminal device. In particular, the control unit 109 controls notification to a user that the channel is being changed when the channel is being changed.

Figure 3A:
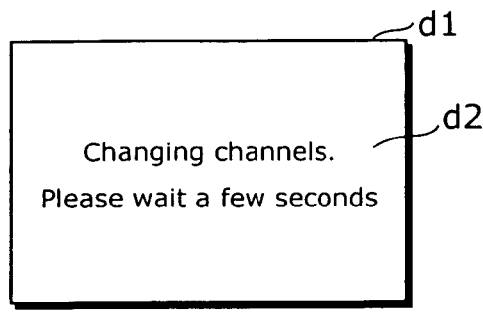
FIG. 3A is an illustration that shows an example of the display of a channel changing notification.
Figure 3B:
FIG. 3B is an illustration that shows an example of the display of a channel changing notification.
Figure 3C:
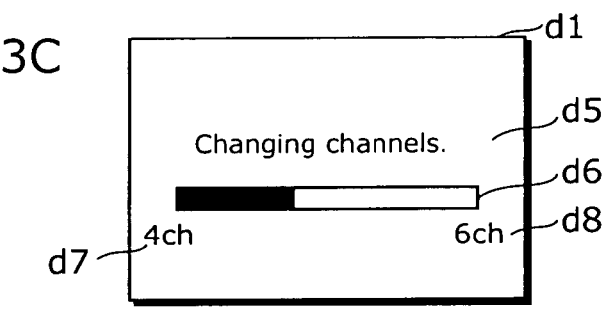
FIG. 3C is an illustration that shows an example of the display of a channel changing notification.

FIGS. 3A-3D are figures that show examples of a display for notifying a user that the channel is being changed. In FIG. 3A, an example message d2 with a line of text reading: "Changing channels. Please wait a few seconds." is displayed in a display d1. In FIG. 3B, an example message d4 with a line of text reading: "Changing channels." in the display d1 is displayed, superimposed above a final image d3 of the original receiving channel. In FIG. 3C, an example message d5 with a line of text reading: "Changing channels.", a graphic d6 that changes according to the channel changing progress state (progress bar), a channel number d7 of the original channel and a destination channel number d8 are displayed. In FIG.

3D, a line text message d9 reading "Changing channels.", a graphic d10 that changes according to the channel changing progress state (an arrow which changes the broken line into a continuous line), the name of the original channel d11 (AAATV) and the name of the destination channel d12 (BBBTV) are displayed.

Figure 3D:
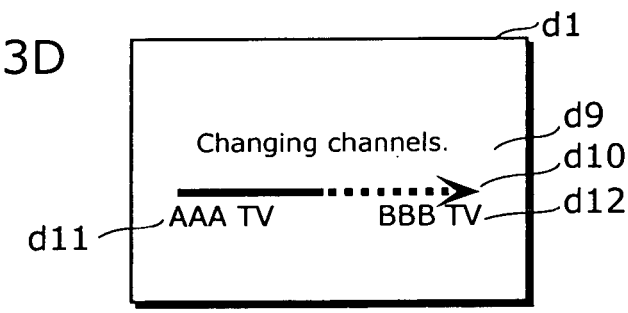
FIG. 3D is an illustration that shows an example of the display of a channel changing notification.
Figure 4A:
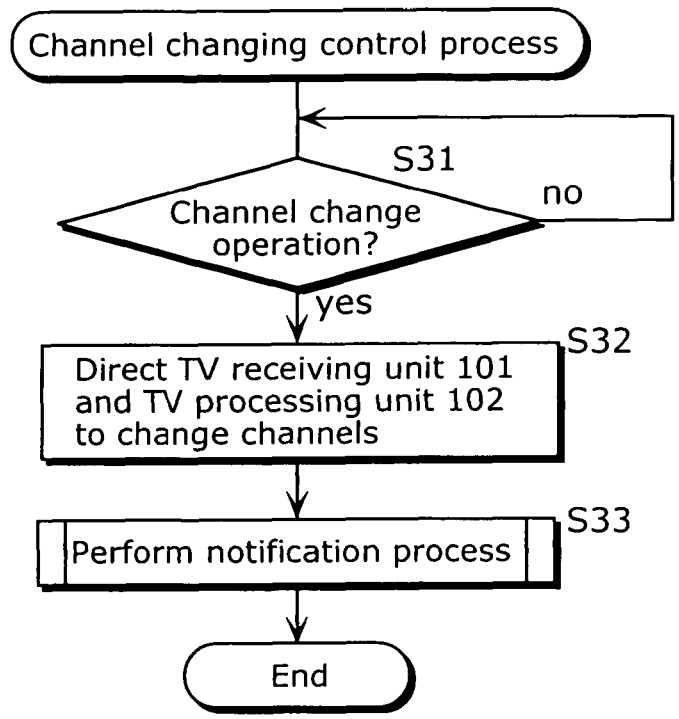
FIG. 4A is a flowchart that shows the control process for channel changing.

FIG. 4A is a flowchart that shows the channel changing control process by the control unit 109. As shown in the figure, in the case that the control unit 109 detects that the channel changing operation has been performed in the operation unit 108 (S31), the control unit 109 instructs the TV receiving unit 101 and the TV processing unit 102 to change the channel (S32), and as shown in FIGS. 3A-3D, performs a notification process to notify a user that the channel is being changed (533).

Figure 5:
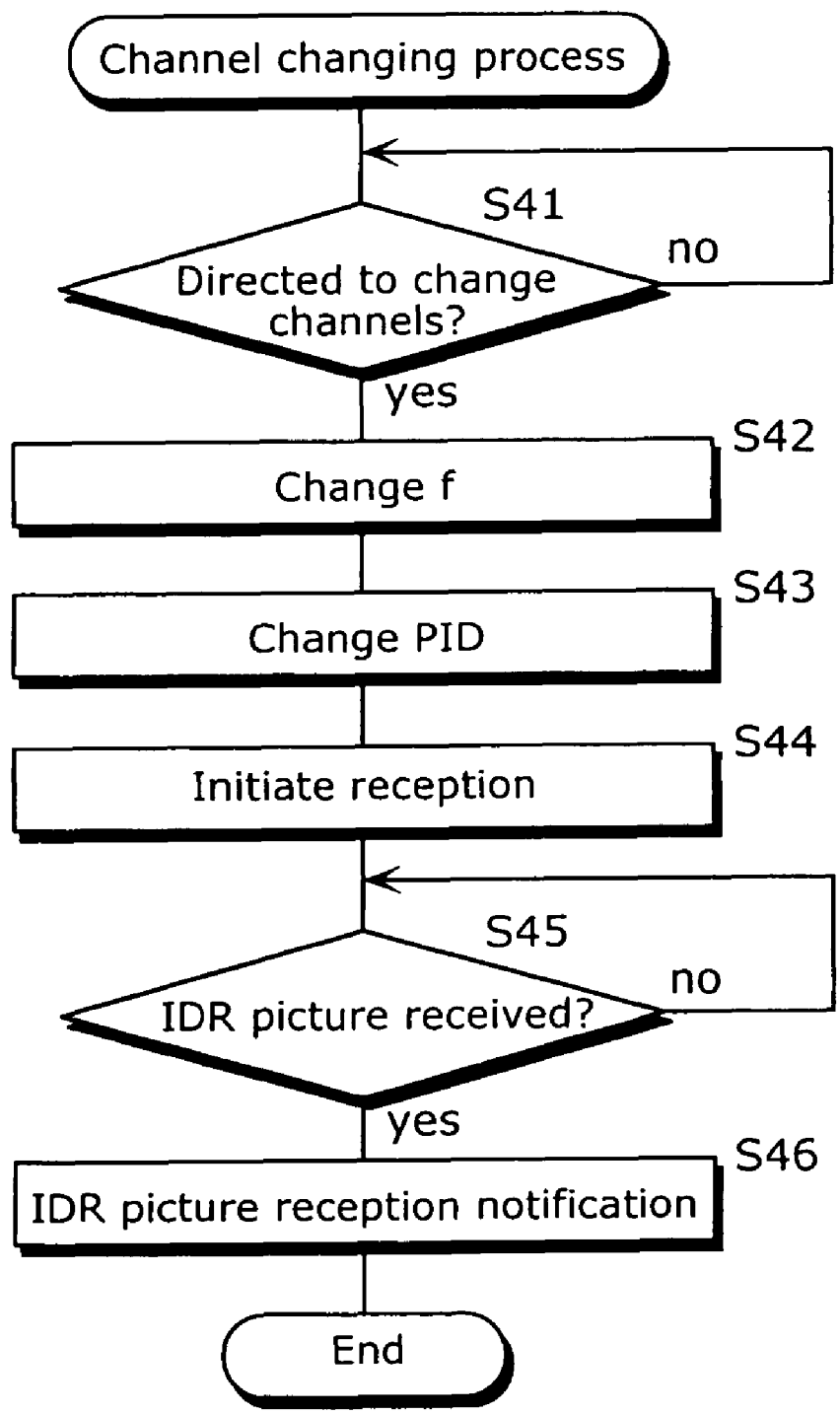
FIG. 5 is a flowchart that shows the channel changing process.

FIG. 5 is a flowchart that shows the channel changing process in the TV receiving unit 101 and the TV processing unit 102. As shown in the figure, in the case where the TV receiving unit 101 receives the direction to change the channel from the control unit 109 (S41), in the case that the TS frequency which includes the destination channel and the current receiving frequency differ, the TV receiving unit 101 changes the receiving frequency to a new frequency (S42). The TV processing unit 102 changes the current PID (program ID) for filtering a TS packet to the PID of the destination channel (S43) and begins to receive the TS packet of the destination channel (S44). By doing so, the system decoder 201 filters the TS packet belonging to the destination channel, extracts a video stream and audio stream from the TS packet obtained in filtering and stores the video stream in the stream buffer 202 and the audio stream in the stream buffer 203. The video decoder 204 determines whether or not the IDR picture initially received in the stream buffer 202 is present (S45), and when the initial IDR picture is determined to be present, the video decoder 204 begins decoding along with outputting an IDR picture reception notification, that an IDR picture was received, to the control unit 109 (S46).

In this way, the time period until the initial IDR picture is received from the user's channel changing operation is not instantaneous for the user; often an amount of time is required as shown in FIG. 7 (for example five seconds at most).

Figure 6:
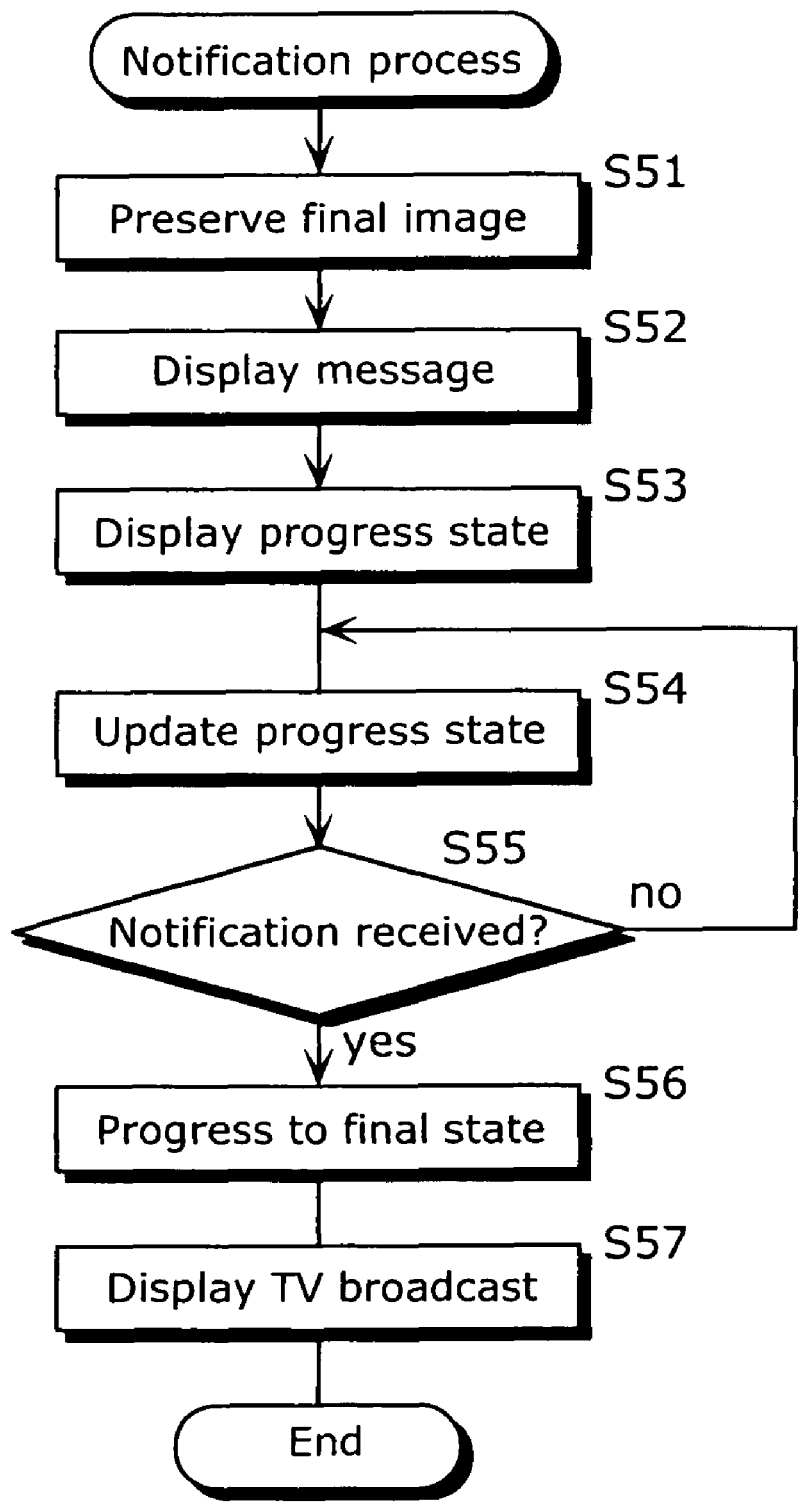
FIG. 6 is a flowchart that shows the notification process.

FIG. 6 is a flowchart that shows the details of the notification process (S33) in FIG. 3. As shown in the figure, the control unit 109 preserves without erasure the last picture image of the original channel in the video buffer 206, causes the output synchronization unit 208 to output this image repeatedly as a still image and causes the display control unit 105 to display it as a still image (S51). With this, a final image d3 of the original channel like FIG. 3B is displayed as a still image. Further, the control unit 109 makes the display control unit 105 display a message (S52). For example, the display control unit 105 displays text message lines d2, d4, d5 or d9, as shown in FIG. 3A-FIG. 3D. Additionally, the display control unit 105 may display the original channel number d7 and the destination channel number d8 as in FIG. 3C, as well as the original channel name d11 and the destination channel name d12 as in FIG. 3D.

Subsequently, the control unit 109 makes the display control unit 105 display a graphic that indicates the initial state of the channel changing (S53). For example, the display control unit 105 displays a progress bar with a progress of 0 (i.e. completely white) for the graphic (progress bar) d6 as in FIG. 3C, or the display control unit 105 displays an arrow at which the progress is 0 (i.e. a complete broken line) for a graphic (an arrow) d10 as in FIG. 3D. Further, the control unit 109 directs the display control unit 105 to update the graphic display above so that it shows the progress state until the IDR picture reception notification from the TV processing unit 102 has been inputted (S54, S55). By doing this, the display control unit 105 updates the display, for example, to gradually extend the black band portion or the continuous line portion of the arrow. At this time, the display control unit 105 continuously or gradually updates the display so that the final state is reached from the initial state for the maximum amount of time that is taken until the initial IDR picture is received.

Further, when the IDR picture reception notification from the TV processing unit 102 is inputted, the display control unit 105 instructs the control unit 109 to update the graphic display to its final state (S56). The display control unit 105 displays the graphics updated to the final state between for example 100 mS to a few 100 mS. By doing this, the progress bar is updated as a full black band, or the arrow is updated into a fully continuous line and the user can understand that the channel changing process has finished. After this, the control unit 109 directs the display control unit 105 to display the television broadcast program of the destination receiving channel. By doing so, the user is able to view the television broadcast program of the destination channel.

The control unit 109 detects the time period from the user's channel changing operation shown in FIG. 4A until the IDR picture reception notification in FIG. 6 as the approximate channel changing period. The channel changing period is exactly the changing period from the channel changing operation until the IDR picture is decoded and displayed. In the TV processing unit 102, a delay time occurs from after the IDR picture is received until it is decoded and displayed. For the display control unit 105, it is preferable to make the display time of the final state above congruent with the delay time.

As explained-above, according to the mobile terminal device in the present embodiment, it is possible when changing channels to prevent a user's misperception that a malfunction occurs in the device. Further, by making it possible to measure the remaining time during the channel changing period, the user can be given a sense of satisfaction. Likewise, by displaying the number or name of the original and destination channels during the channel changing period, the user can be given a sense of satisfaction.

Figure 3E:
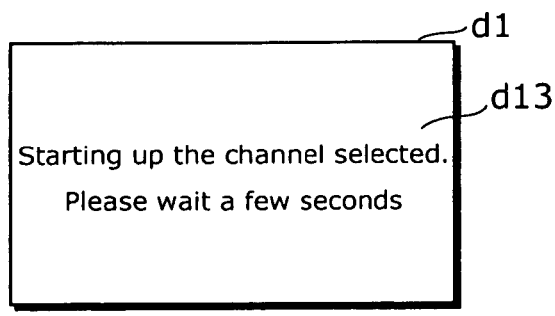
FIG. 3E is an illustration that shows an example of the display of a reception initiation notification.
Figure 4B:
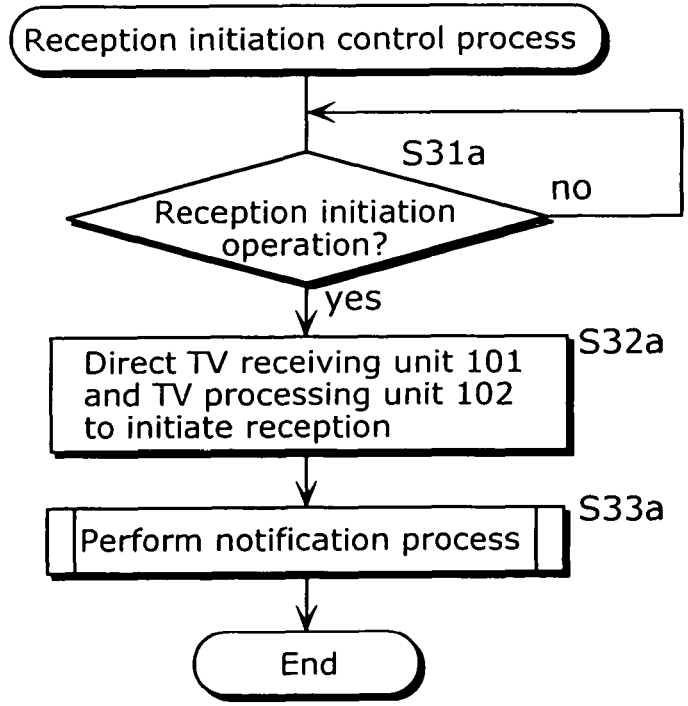
FIG. 4B is a flowchart that shows the control process for reception initiation.

Note that the control unit 109 may also be set to notify the user of a start-up period, not just during the channel changing period, but also during the reception starting-up period from when a user operation to newly view a television broadcast is received until the broadcast is actually displayed. A control action by the control unit 109 for this case is shown in FIG. 4B. FIG. 4B is a flowchart that shows the reception initiation control process in order to start up the TV receiving unit 101. As shown in the figure, the control unit 109 directs the TV receiving unit 101 and the TV processing unit 102 to initiate reception (S32a) in the case that the control unit 109 detects that a reception initiation control process has been conducted (S31a), and as shown in FIG. 3E, performs a notification process to notify the user of the reception start-up period (S33a). By performing this notification process, for example, in the case where, in a standby state, a user newly views a television broadcast, and in the case where a user in an e-mail composition mode newly views a television broadcast, it is possible to prevent a user's misperception that a malfunction occurs in the device and to give the user a sense of satisfaction.

Also, notification of the channel changing period or the reception start-up period may be at least one of the following: audio output, LED or back-light emission and vibrator vibration.

Likewise, the above notification may be conducted in at least one part of the channel changing period, i.e., the interval between the start of channel changing and the end of the channel changing.

Note that the display control unit 105 may display a numerical countdown instead of the progress state displays in FIG. 3C and FIG. 3D, and that the destination channel number or the channel name may be made to flash instead of the progress state displays in FIG. 3C and FIG. 3D. The destination channel number or the channel name may also be flashed. In addition, the display may be performed as in FIG. 3B-FIG. 3D instead of FIG. 3E.

Likewise, the display control unit 105 may be set to store the final picture image before channel changing in video RAM inside the display control unit 105, instead of the video buffer 206, and to display this image during the channel changing period.

Further, the display control unit 105 may display a specific image prepared in advance instead of the final picture image before the channel is changed. The specific image may also be an image received from a digital television broadcast. This specific image may also be an advertising image, a help image or a guidance image for receiving a digital television broadcast. Also, an icon can be displayed as a specific image in the display screen.

Also, the TV receiving unit 101 and the TV processing unit 102 may receive and reproduce the 12 segments in TS instead of receiving and reproducing the one segment in TS. Likewise, the TV receiving unit 101 and the TV processing unit 102 may receive and reproduce a digital satellite broadcast instead of a digital terrestrial broadcast.

Further, the functional blocks of the block diagram shown in FIG. 1 and FIG. 2 are typically achieved in the form of an integrated circuit or a Large Scale Integrated (LSI) circuit. The functional blocks can be implemented in plural single-function LSIs, or also can be in one integrated LSI. For example, the functional blocks besides memory such as the video buffer 206 may also be made into a single chip. The name used here is LSI, but it may also be called IC, system LSI, super LSI, or ultra LSI depending on the degree of integration.

Ways to achieve integration are not limited to the LSI, and special circuit or a general purpose processor and so forth can also achieve the integration. A Field Programmable Gate Array (FPGA) that can be programmed after manufacturing LSI or a reconfigurable processor that allows re-configuration of the connection or configuration of LSI can be used for the same purpose.

In the future, with advancement in manufacturing technology, a brand-new technology may replace LSI. The integration can be carried out by that technology. Application of biotechnology is one such possibility.

Also, in each functional block, without making each unit that stores data into a single chip, each unit may be configured separately as in the recording media 115 in the present embodiment.

Likewise, in each functional block of the block diagrams shown in FIG. 1 and FIG. 2, as well as in the flowcharts shown in FIG. 4A and FIG. 4B-FIG. 6, the main parts, including the control unit 109, are implemented by a microprocessor as well as a program. Accordingly, the present invention may be composed as a program.

The present invention is applicable to a receiving device that receives a digital television broadcast such as, for example a television receiving set, an STB (Set-Top Box), a cellular telephone with television, a PDA (Personal Digital Assistant) with television, an electronic book device with television, an electronic dictionary with television, a mobile personal computer with television and a mobile DVD (Digital Versatile Disc) recording/reproduction device with television.

The invention claimed is:

1. A mobile terminal device, comprising:
   a receiving unit operable to receive a television broadcast;
   a detection unit operable to detect an undetermined period for determining an output of the receiving unit, the undetermined period being a changing period that is from a channel changing operation until an IDR picture is decoded and displayed, the IDR picture being a picture, among I pictures, which indicates that all reference pictures stored in a reference picture memory in a decoder are allowed to be invalidated; and
   a notification unit operable, during the undetermined period, to notify a user of the undetermined period and display, in a display screen, information that indicates a progress state of the undetermined period, the information indicating the progress state is at least one of a graphical bar that changes according to the progress state, a mark that changes according to the progress state, and a numeral value that is counted down according to the progress state,
   wherein the notification unit is also operable to:
   continuously or gradually update the information of the progress state to indicate a final state is reached, the final state being based on a maximum amount of time it takes from an initial state until the IDR picture is received; and
   update the information that indicates the progress state is in the final state when the IDR picture is received and further display information indicating the final state for a predetermined time, the predetermined time corresponding to a delay time from the time when the IDR picture is received until when the IDR picture is decoded and displayed, and the IDR picture which has been received is displayed after the final state is displayed for the predetermined time.

2. The mobile terminal device according to claim 1, wherein the detection unit is further operable to detect, as the undetermined period, at least one of a changing period from when a change of a receiving channel is initiated until an output of the receiving unit is determined, and a start-up period from when the receiving unit is started up until the output of the receiving unit is determined.

3. The mobile terminal device according to claim 1, wherein the notification unit is further operable to notify the user of the changing period or the start-up period by at least one of audio output, light emission, vibration, and display in a display screen.

4. The mobile terminal device according to claim 3, wherein the notification unit is further operable to display information related to a channel in the display screen.

5. The mobile terminal device according to claim 4, wherein the information related to a channel includes at least one of a number of an original channel, a number of a destination channel, a name of the original channel, a name of the destination channel, a number of the channel starting-up, and a name of the channel starting-up.

6. The mobile terminal device according to claim 2, wherein the notification unit is further operable to display an image received before the channel is changed as a still image in a display screen.

7. The mobile terminal device according to claim 1, wherein the notification unit is further operable to display a specific image in a display screen.

8. The mobile terminal device according to claim 2,
wherein the notification unit is further operable to notify the user of the changing period by at least one of audio output, light emission, and vibration.

9. A receiving method for a mobile terminal device that includes a receiving unit that receives a television broadcast, the method comprising:
- a detecting step of detecting an undetermined period for determining an output of the receiving unit, the undetermined period being a changing period that is from a channel changing operation until an IDR picture is decoded and displayed, the IDR picture being a picture, among I pictures, which indicates that all reference pictures stored in a reference picture memory in a decoder are allowed to be invalidated; and
- a notifying step of notifying a user of the undetermined period and displaying, in a display screen, information that indicates a progress state of the undetermined period, the information indicating the progress state is at least one of a graphical bar that changes according to the progress state, a mark that changes according to the progress state, and a numeral value that is counted down according to the progress state, wherein also in the notifying step:
- continuously or gradually updating the information for the progress state to indicate a final state is reached, the final state being based on a maximum amount of time it takes from an initial state until the IDR picture is received; and
- updating the information that indicates the progress state is in the final state when the IDR picture is received and further displaying information indicating the final state for a predetermined time, the predetermined time corresponding to a delay time from the time when the IDR picture is received until when the IDR picture is decoded and displayed, and the IDR picture which has been received is displayed after the final state is displayed for the predetermined time.

10. A semiconductor device, comprising:
- a receiving unit operable to receive a television broadcast;
- a detection unit operable to detect an undetermined period for determining an output of the receiving unit, the undetermined period being a changing period that is from a channel changing operation until an IDR picture is decoded and displayed, the IDR picture being a picture, among I pictures, which indicates that all reference pictures stored in a reference picture memory in a decoder are allowed to be invalidated; and
- a notification unit operable, during the undetermined period, to notify a user of the undetermined period and display, in a display screen, information that indicates a progress state of the undetermined period, the information indicating the progress state is at least one of a graphical bar that changes according to the progress state, a mark that changes according to the progress state, and a numeral value that is counted down according to the progress state, wherein the notification unit is also operable to:
- continuously or gradually update the information of the progress state to indicate a final state is reached, the final state being based on a maximum amount of time it takes from an initial state until the IDR picture is received; and
- update the information that indicates the progress state is in the final state when the IDR picture is received and further display information indicating the final state for a predetermined time, the predetermined time corresponding to a delay time from the time when the IDR picture is received until when the IDR picture is decoded and displayed, and the IDR picture which has been received is displayed after the final state is displayed for the predetermined time.

* * * * *